United States Patent Office 3,220,277
Patented Nov. 30, 1965

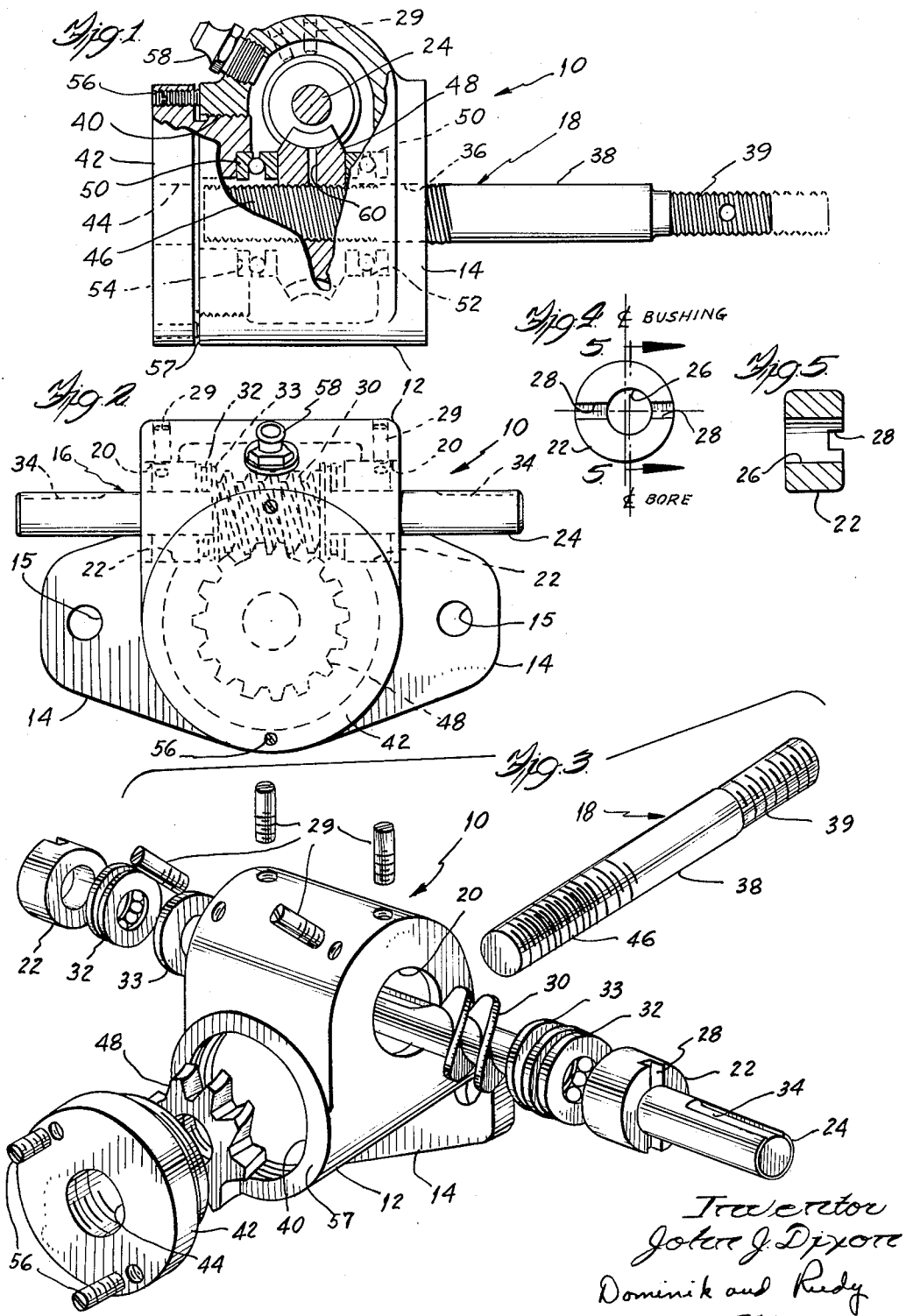

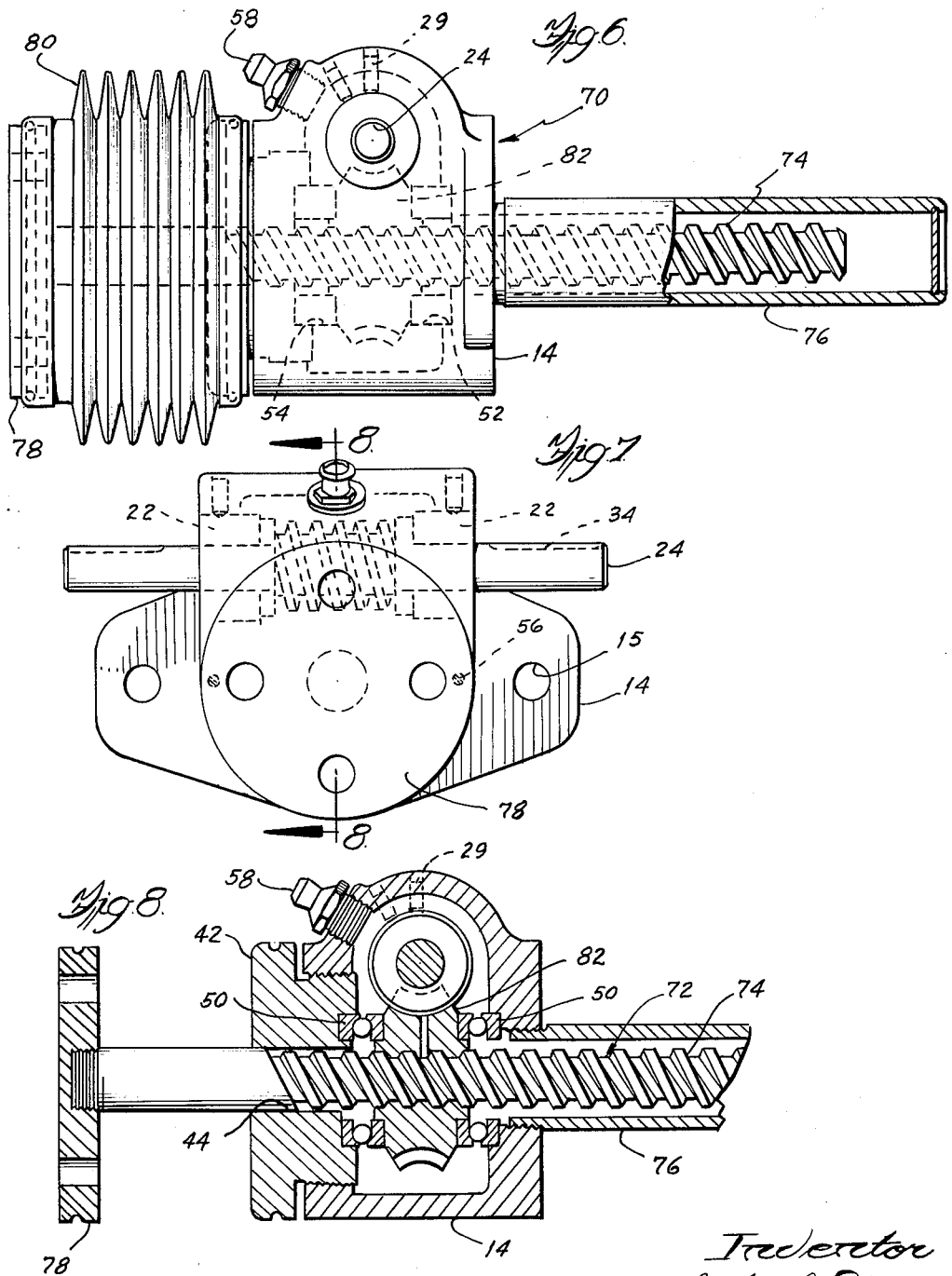

3,220,277
WORM GEAR JACK
John J. Dixon, Charlotte, N.C., assignor to Duff-Norton Company, a corporation of North Carolina
Filed May 20, 1963, Ser. No. 281,740
7 Claims. (Cl. 74—424.8)

The present invention relates to a worm gear jack, and more particularly to a miniature worm gear jack in which backlash has been held to an irreducible minimum thereby permitting the jack to actually move substantial loads with a positioning precision heretofore unattainable with such type devices. Because of the anti-backlash features employed in the subject miniature worm gear jack, its utility may be exploited in both compression and tension loading without modification of the structure, and without attendant aberrations in the positioning accuracy.

While the patent and commercial literature may abound with worm gear jacks (see for example, United States Patent No. 3,055,310, entitled, Railroad Rip Track Installed), the prevailing usage of worm gear jacks is in massive installations where the mechanical interaction of jack couples is required to move large loads at a given rate. Seldom are the jack constructions thus employed required to shift their efforts from compression to tension, and accuracies in the order of ± .001 inch of backlash are unknown.

The present invention looks to the provision of a worm gear jack which will provide precise adjustment, reversibility of load, and a backlash reduction to that degree which permits the worm gear jack to move substantial loads to exact positions ascertainable solely by count of the worm shaft rotation or resultant angular displacement of the worm.

One of the important objects of the instant invention is to provide a worm gear jack in which the worm and gear relationships may be substantially, if not totally, the subject of complete backlash elimination. A closely related object of the invention is to provide for the ready factory and field adjustability of backlash and wear compensation for continued reduction of backlash.

Another object of the invention is to furnish a worm gear jack with movement ratios which permit adjustment for the precise measured position of loads.

While the foregoing references to the invention imply compensation for inherent weaknesses, this should not detract from a further more detailed objective of the invention relating to a dynamic lubrication provision which provides a longer life, and friction reduction, while virtually self-policing in its effect.

Still another object of the invention is to relate worm, worm gear, and lifting screw with ratios of linear and angular movement which dictate simplicity and precision in operation.

These and further objects and features of the invention will become more apparent from the following description and accompanying drawings wherein:

FIG. 1 is an elevation view, in partial section, of a worm gear jack, illustrating an embodiment of the invention;

FIG. 2 is an end view of the same;

FIG. 3 is an exploded perspective-like view of the same;

FIG. 4 is an end view of an adjustment bushing used in the jack of FIG. 1;

FIG. 5 is a section view generally as seen along line 5—5 in FIG. 4;

FIG. 6 is an elevation view, in partial section, of a worm gear jack, illustrating an embodiment of the invention;

FIG. 7 is an end view of the same; and

FIG. 8 is a section view generally as seen along line 8—8 in FIG. 7.

Referring now to the drawings, and more particularly to FIGS. 1 to 5, numeral 10 identifies a worm gear jack illustrative of an embodiment of the invention which includes a hollow housing, or shell 12, having a pair of integral, diametrically opposed mounting lugs, or flanges 14, at one end. Each lug 14 may have a bolt hole 15 for positional mounting of the jack. The housing 12 is arranged to operatively support a power input shaft assemblage 16 and a power ouptut screw or shaft assemblage 18, which assemblies are arranged with their axis at 90° relative to each other. Toward this end the housing has axially aligned, equivalent diameter bores, or holes 20, each of which slidingly supports a rotatable adjusting bushing 22. The bushings are adapted for adjustment of the axial position of a shaft 24 of the power input shaft assemblage 16, so that the interfit condition of a worm gear connection can be corrected to minimize, or eliminate backlash. As best seen in FIG. 4, the bushing 22 has a bore 26 which is eccentrically arranged relative to the outer, circular periphery of the bushing, the distance between the respective centerlines being in the order of .002". Diametrically arranged slots 28 are provided on one of the side faces of each bushing 22, which slots are adapted to receive a spanner wrench (not shown) for rotation of the bushing in their associated bores 20 for shaft alignment, as will be more apparent hereinafter. Set screws 29 are positioned in the housing to lock the bushings in any rotary and axial position of adjustment.

The shaft 24, which is rotatably supported in the bushings 22, is formed with a worm thread portion 30 enclosed by the housing 12 when the shaft assembly 16 is mounted in the jack. A pair of needle thrust bearings 32 are mounted upon the shaft 24, one on each side of the worm thread portion 30, the outer surface of each bearing being in engagement with an adjacent adjusting bushing 22, while the inner surface of each bearing engages a washer 33 abutting an end of the worm thread portion, as best seen in FIG. 2. The shaft 24 is arranged to project from both sides of the housing, as shown, so as to provide greater flexibility in installation, however, it may be arranged to project from only one side in installations wherein the position of the motor means is known in advance. A longitudinal groove 34 is arranged on each end of the shaft, for receipt of a key (not shown) whereby the shaft may be coupled in well known manner to a motor means.

A bore, or hole 36 is formed in a base, or wall of the housing 12 to slidingly receive a screw 38 of the power output screw assembly 18. An end of the screw has a threaded portion 39, for coupling to a load means (not shown). Opposite the bore 36, a large diameter bore, or hole 40 is formed in the opposite wall of the housing to threadably receive a shell cap 42. The latter may be of solid construction, or may have a bore, or hole 44 to slidingly receive the screw 38 when assembled from the side of the jack opposite to that shown, or for accommodating an extension of the screw (not shown) if so desired, which would allow greater flexibility in mounting of the jack, or which would provide parallel load movement in the same direction at each end of the screw. The screw 38 is provided with a thread portion 46 which threadably supports a worm gear, or wheel 48. In order to have a micrometer-type axial movement of the screw 38, the threads of the portion 46 are of fine gauge, somewhere in the range of 50 threads per inch. The screw 38 is arranged so that the gear 48 will operatively engage worm thread 30 with a minimum of clearance and is further proportioned to provide a minimum of backlash.

A pair of ball bearings 50 are positioned so that one side of each abuts the gear 48. The bearings 50 are supported concentrically about the shaft, one being arranged in a recess 52 formed in the inner wall of the housing 12 and in axial alignment with the bore 36, while the other bearing is supported in a recess 54 formed on the inner surface of the cap 42 and in axial alignment with the center thereof. Set screws 56 are arranged in the shell cap 42, and may be rotated into locking abutment with a surface 57 of the housing 12 to fix the cap in any position of angular and longitudinal adjustment. In such manner, the gear wheel 48 may be adjustably positioned in proper operative engagement with the worm 30, and correction may be made for variation in bearing thickness as well as elimination of backlash, by merely rotating the shell cap 42 as required.

A grease fitting 58 is positioned in the housing 12 whereby the worm gear arrangement may be conveniently lubricated. To assure full lubrication between the worm gear 48 and the threads 46, one or more radially arranged passageways 60 may be formed in the worm gear, which passageways extend from the region between adjacent teeth to the threaded hole of the gear. Rotation of the worm will develop a pumping action which will force lubricant through the worm gear passageways to the screw thread.

The jack 10 is adapted to provide micrometer load movement. For example, with a 20:1 worm gear ratio, and 50 threads per inch on the output screw 38, one full turn of the input shaft 24 will result in a .001" longitudinal, or axial travel of the output screw 38. Or in other words, 1000 turns of the input shaft will provide a one inch longitudinal, or axial travel of the output screw. With a size and relative proportion of parts as illustrated in the drawings, which may have a total weight of only approximately 2 lbs., either a tension of compression load up to 500 lbs. may be handled by the output screw 38. However, much larger jacks may be made, in accordance with the principles of the invention, to handle almost any load with similar favorable jack weight to load ratio. The overall backlash range, if the parts are accurately made, and the jack is properly adjusted, will not exceed .001".

From the foregoing it will be realized that the jack of the invention is well suited for use in small quarters, will develop a high load handling capacity, and can be used for very minute load movements which can be directly related to input shaft rotation. This last named feature could be of great importance in certain assembly operations wherein large load movements within extremely close tolerance ranges, are involved.

A second embodiment of a worm gear jack, which differs from the jack 10—primarily in the details of the worm gear—is illustrated in FIGS. 6 to 8 inclusive. To avoid repetition, the description will be limited to the parts of the second jack which differ from the jack 10, and parts in common with jack 10 will be identified by use of the same numeral.

A worm gear jack 70, illustrative of a second embodiment of the invention, includes a power output screw 72 which is formed with a screw thread 74 over a major portion of its length. While a double thread form is shown, a single thread may be more desirable in certain installations because of the generally non-self-lowering characteristic of a single thread. The thread is arranged to provide relatively fast axial movement of the screw, and as such may be of the Acme steel form and have a .250" pitch. A tube 76 is threadably secured to the housing to enclose the projecting threaded end of the screw 72, to protect the screw against damage. The opposite end of the screw projects through the shell cap 42, and has a top plate 78 secured thereto which may be affixed to a load (not shown). A bellows boot 80 may be arranged between the disc 78 and the shell cap 42 to protect the screw against damage, or corrosive atmosphere.

Threadably mounted upon the screw 72 is a worm gear, or wheel 82, arranged to engage the thread 30 of the power input shaft 24. Adjustment bushing means 22 are provided for regulating the position of the power input shaft 24, relative to the worm gear 52 for control of backlash in the manner as described in detail hereinbefore.

The jack 70 may be provided with a 5:1 worm gear ratio wherein 20 turns of the worm will cause a one inch axial movement of the output screw 72, with exception of the relatively fast longitudinal travel of the output screw 72, the jack 70 has advantageous features similar to that of the jack 10.

From the foregoing, it will be apparent that the worm gear jacks 10 and 70 both satisfy the objectives set forth in the early part of this disclosure.

The foregoing description has been given in detail without thought of limitation since the inventive principles invloved are capable of assuming other forms without departing from the spirit of the invention or the scope of the following claims.

What is claimed is:

1. A precision worm gear jack comprising, in combination, a housing, a worm supported thereby, a worm gear, having a central threaded opening, a power output screw having a thread interfitting with the worm gear threaded central opening, a shell cap for the housing, said shell cap having a threaded recessed cylindrical portion, means defining a cylindrical threaded portion in the housing coaxial with the power output screw, load bearings coaxial with the power output screw and flanking the worm gear, housing seat means for one of the load bearings, a load bearing seat on the shell cap central of its threaded cylindrical portion, and means for setting the shell cap against rotation after threadedly engaging the same with the housing whereby the shell cap serves to compress the load bearings to minimize backlash along the lifting screw axis.

2. A precision worm gear jack according to claim 1 in which the worm gear ratio is 20:1, and the power output screw has 50 threads per inch thereby delivering exactly .001" travel for one revolution of the worm and requiring 1000 revolutions for one inch of travel.

3. A precision worm gear jack according to claim 1 in which lubrication means in the form of a radial passageway is provided in the worm gear from the tooth root to the threaded interfit with the power output screw whereby lubricant picked up by the worm is pressure fed to the power output screw-worm gear thread interfit.

4. A precision worm gear jack comprising, in combination, a housing, a worm supported thereby, a worm gear having a central threaded opening, a power output screw having a thread interfitting with the worm gear central threaded opening, smooth bearing shafts flanking the worm and coaxial therewith, a pair of opposed thrust bearings flankingly abutting the worm and coaxial therewith, a pair of opposed worm retainer bushings centrally bored for a snug fit with the worm shafts and abutting the opposed thrust bearings and having an exterior eccentrically modified cylindrical surface, cylindrical bore means in the housing proportioned to receive the eccentric retainer bushings, and set means for securing the eccentric retainer bushing whereby the worm and worm gear relationship may be adjusted along two axes to remove their backlash relationship along the radial axis of the gear and the longitudinal axis the worm.

5. A worm gear jack comprising in combination, a housing, a power input shaft, a power output screw having its axis positioned at an angle to the axis of the power input shaft, a worm thread on the power input shaft, a thread on the power output screw, a worm gear threadably mounted upon the power output screw and being in operative engagement with the worm thread of the power input shaft, shaft adjusting means to fixedly adjust the position of the power input shaft relative to the worm gear so as to regulate the degree of intermesh therebetween, load bearing means positioned in abutment with each side of the worm gear, a shell cap threadably secured to the housing and positioned in abutment with said load bearing means, said shell cap providing a support for the power output screw, and means to lock said shell cap in fixed position relative to said housing.

6. A worm gear jack according to claim 5 wherein a radially arranged lubricating passageway is provided in the worm gear between adjacent teeth and the axial threaded portion of the gear.

7. A worm gear jack according to claim 5, wherein said shaft adjusting means comprise a pair of opposed worm retainer bushings, said bushings being centrally bored for a snug fit with the worm shafts and having an exterior eccentrically modified cylindrical surface, cylindical bore means in the housing proportioned to receive the eccentric retainer bushings, and set means for securing the eccentric retainer bushings whereby the worm and worm gear relationship may be adjusted along two axes to remove their backlash relationship along the radial axis of the gear and the longitudinal axis of the worm.

References Cited by the Examiner
UNITED STATES PATENTS

| | | | |
|---|---|---|---|
| 1,186,434 | 6/1916 | Pierce | 74—468 |
| 1,419,906 | 6/1922 | Klausmeyer | 74—424.8 X |
| 2,281,914 | 5/1942 | Brooks | 74—468 |
| 2,340,707 | 2/1944 | Staley | 74—425 |
| 2,706,915 | 4/1955 | Rosenberg | 74—425 |
| 3,022,066 | 2/1962 | Benes | 74—409 |
| 3,135,497 | 6/1964 | Beck | 74—424.8 X |

DON A. WAITE, *Primary Examiner.*